United States Patent [19]
Babcock et al.

[11] Patent Number: 4,732,782
[45] Date of Patent: Mar. 22, 1988

[54] METHODS FOR APPLYING NO MIX CEMENTS

[75] Inventors: H. Nash Babcock, Old Greenwich; Edward P. Holub, Bethel, both of Conn.

[73] Assignee: The Nomix Corporation, Fairfield, Conn.

[21] Appl. No.: 53,561

[22] Filed: May 21, 1987

Related U.S. Application Data

[63] Continuation-in-part of Ser. No. 843,316, Mar. 24, 1986, abandoned.

[51] Int. Cl.$^4$ ............................................. B05D 1/12
[52] U.S. Cl. .................... 427/427; 427/180; 427/397.7; 427/403
[58] Field of Search ............... 52/742; 405/266, 267; 427/180, 181, 397.7, 427, 140, 136, 403

[56] References Cited

U.S. PATENT DOCUMENTS

| | | | |
|---|---|---|---|
| 3,665,720 | 5/1972 | Havno | 405/226 |
| 3,730,763 | 5/1973 | Schlottmann et al. | 427/427 |
| 3,922,832 | 12/1975 | Dicker | 52/742 |
| 4,129,449 | 12/1978 | Kojima | 405/266 |
| 4,366,209 | 12/1982 | Babcock | 427/180 |
| 4,367,986 | 1/1983 | Miyoshi et al. | 405/266 |

OTHER PUBLICATIONS

Quikrete, Package Pavement Company, Quikrete ® Do-It-Yourself Series, Setting Posts & Mixes and Their Uses, (3 pages).

Primary Examiner—Shrive P. Beck
Attorney, Agent, or Firm—Pennie & Edmonds

[57] ABSTRACT

Dry cementitious compositions and methods for their application. The dry compositions do not have to be mixed with water but instead are poured, sprayed or troweled onto a substrate which contains a substantial excess of water than the necessary for the hydration of the materials. The dry cementitious material may be poured into water then applied to the substrate with no physical mixing other than that produced by pouring the cementitious composition into the water. The process also uses particles having similar drop rates and a cement content greater than 20% by wt.

22 Claims, No Drawings

METHODS FOR APPLYING NO MIX CEMENTS

This is a continuation-in-part of application Ser. No. 843,316 filed Mar. 24, 1986 now abandoned.

TECHNICAL FIELD

The present invention relates to methods and compositions for the application or placement of cementitious compositions which do not require premixing with water.

BACKGROUND OF THE INVENTION

At present, it is essential that all cementitious compositions are mixed with water before placement in order to obtain the proper characteristics of the final product. Some type of mixing is and has always been required. Some manufacturers of premixes have put the dry premix in a hole and then recommended adding the water. Some have put premixes in bags and dropped the mixes while in bags through the water, then after the bags are in place, letting water penetrate through the bag to the mix. However, these systems have not allowed full hydration. Mortar mixers, concrete mixers, hand mixing or other types of wet mixing have been utilized to obtain a uniform distribution of the appropriate amount of water in the cement. According to the prior art, the quantity of water to be mixed with the cement must be controlled to a very narrow range, and too little or too much water will produce an ineffective or unusable material. Cementitious mixtures could not be placed in a dry state directly into water or on to a wet surface without first wetting and mixing the dry components.

SUMMARY OF THE INVENTION

The present invention relates to dry cementitious compositions which have finely divided particles of at least one cement binder. The cement may be Portland cement, gypsum, high aluminum cement, or mixtures thereof, but not restricted thereto. Magnesium phosphate or other fast-setting compounds may also be used. The major proportion of particles have approximately the same drop rate in water, so that when poured through water according to the invention, the material does not appreciably segregate.

These compositions may further include a filler component of sand or aggregate particles, provided that the major proportion of those particles have a drop rate in water which is approximately the same as the cement particles. Also, the cementitious mixture should be able to absorb and/or combine with water in the amount approximating 50% by volume. The higher the amount of water the cementitious mixture can tolerate, the better the finished product.

It is possible to use other additives in these compositions. Such additives may include, but are not limited to, accelerators, water reducing compounds, pumping aids, water absorbing compounds, waterproofing agents, polymers, drying shrinkage inhibitors, wet shrinkage inhibitors, lime, pigments and the like, and may be added to improve or impart a particular property to the composition.

The invention also relates to a method for making these compositions. These methods include providing the cement binder in the form of finely divided particles and adjusting the drop rate of the major portion of particles to approximately the same range. Filler components, if added, are treated the same. When fillers are added, it is preferable to mix the dry ingredients to a homogenous consistency.

The invention also contemplates various methods for installing cement products upon a substrate which comprises saturating the substrate with an amount of water which is substantially in excess of the normal amount of dry components which are subsequently added. The dry powder is added without mixing in a manner such that it combines with a portion of the water and displaces the remainder of the water. The applied combination is then allowed to cure to a final product.

The present invention also relates to a method for molding a cementitious composition into an article having a desired shape or configuration which comprises preparing molding means in a predetermined shape or configuration corresponding to the desired shape or configuration of the article; substantially filling the molding means with water to provide a substantial excess of that needed for hydration of the cementitious composition which will be used to make the article; introducing into the water in the molding means a dry cementitious composition in the form of finely divided particles of at least one cement binder in an amount of greater than 20 percent by weight of the composition, the major proportion of the particles having approximately the same drop rate, by pouring the composition into the water without any type of physical mixing of the cementitious composition and the water other than the mixing which occurs when the composition is poured into the water, such that the cementitious composition becomes completely hydrated by combining with a portion of the water and displacing excess water, if any, from the molding means; and allowing the hydrated cementitious composition to set or cure to a self supporting solid in the desired shape or configuration.

In one aspect, the holding means comprises mold means configured to form a predetermined shape and the set or cured composition is removed from the mold means in the form of the predetermined shape. Alternately, the holding means comprises temporary mold means configured to form a predetermined shape wherein the temporary mold means can be removed to obtain the set or cured composition in the predetermined shape.

These specific methods are presented hereinbelow.

DETAILED DESCRIPTION OF THE PREFERRED EMBODIMENTS

The invention relates to dry cementitious compositions which are poured, troweled or sprayed through excess water or onto wet surfaces without mixing to hydrate the cement component and obtain high strength products after setting and curing. Cementitious compositions of Portland cements, gypsums, high alumina cements, other specialty cements and combinations, as well as other chemicals such as magnesium phosphates, all have been successfully used, the only limitation being that at least one component of the cementitious composition is hydrated by or reacts with water.

When the formulations of these cementitious compositions are properly controlled, the problems of thorough wetting of the cement without overwetting, of segregation or components, and of loss of compressive strength of the cured product are greatly reduced or eliminated.

Where cement coatings are desired, the surface area to be coated is first prewetted and saturated with water. The dry cementitious mixture is placed on the surface, instantly reacting with the wet surface. If additional layers or a greater thickness of the coating is needed, the first cement layer can be prewetted and the dry composition sprayed directly thereupon to increase the thickness and structural strength of the overall coating.

On horizontal surfaces, the area to be poured with cement is first flooded with water, then the dry cementitious compositions of the invention can be poured into the water. The excess water is displaced by the cementitious composition, and the composition is then allowed to cure. This provides a fast, simple installation of cement without the need for tools, mixing apparatus, water measurement aids or the like. For floor levelings, for example, the floor can be flooded to form puddles in low areas. The dry cementitious composition is then sprinkled in the areas where puddles are formed, and allowed to cure. Thus, the floor is easily levelled by this procedure.

Controlling the rate of hydration may lead to many applications. For instance, for coating vertical surfaces, a very fast setting material can be used to eliminate the problems of running, sagging or failure to bond. Where mortar for bricklaying is desired, a material with a longer set time will allow the operator sufficient time to work with the material. For situations where the surface particles have not been properly wetted, additional water may be applied to the surface for more activation and further finishing.

In the past, there has always been difficulty in controlling the amount of water for the patching of highways or other horizontal surfaces. This problem is solved by this invention because the amount of water is controlled by the formulation of the dry cementitious composition itself. For example, water can be placed into a footing, post hole, mortar joint or tub, or pothole and then the dry cementitious material may be placed by pouring, spraying, or screening into the cavity until the desired level is reached. Excess water, if present, is displaced from the hole by the dry material. The rate of setting of the cementitious mixture can be designed to meet the needs of the particular application. The amount of water required depends on the specific composition and application used.

For the placement of concrete foundations, a hole is first prepared, then filled with the required amount of water. If desired, forms can be used to help contain the water. The dry material can be then poured directly into the foundation area to the desired height, thus displacing the excess water, if any. After the material cures, the foundation is complete.

In certain circumstances, a cavity could have a small percentage of water placed into it and then the first part of the cementitious mixture placed into the water. While this placement is taking place, additional water could then be placed into the hole by various methods simultaneously with the placement of the rest of the cementitious mixture. When the final quantity of the cementitious mixture is reached, the entire surface area could be sprayed for troweling or other finishing purposes as could be done when the entire mixture is poured through water.

In the situation where the cavity is porous and cannot hold water, it is possible to thoroughly wet the surfaces of the hole and then introduce a fast setting cementitious mixture. It is then possible to fill the lined hole with water and proceed as above.

The control of density and size of the dry and size of the dry components and the rate of drop through water is essential for the proper performance of the cementitious mixtures. The ability to use materials of various sizes and densities, whose drop rate would otherwise be higher if a slow setting cementitious mixture was used, is enhanced by the increased rate of the water activation of the cementitious particles to form a homogeneous mixture. The most advantageous formulations include those wherein substantially all the particles have substantially the same drop rate.

The use of specific cementitious compositions may be varied or adjusted to meet the needs of the particular application. The most ideal situation is to balance the drop rate for all the dry ingredients and to control the setting time of the cement so that all particles will be properly hydrated and integrated with the aggregates, if any. In this manner, masonry walls can be built up with dry mortars which are hydrated after installation. Precast and prestressed sections are put in place, the dry mixture is placed in water in the joints and the surface can be wetted down for complete activation of the cement binder. The setting time of the binders can be accelerated to a few seconds or slowed up for days, depending upon the selection of cement component.

The invention also contemplates forming blocks or shapes of the cementitious compositions of the invention by forming a temporary or permanent mold, filling the mold with water, and adding these cements in the manner described previously. After the cementitious material has set or is cured, it can be removed from the mold. In the case of large shapes, the mold can be removed after the material has set or cured.

Molds can be made out of various types of molding materials in use today, such as cement, gypsum, wood, plastic, metal, etc. These molds can be shaped to form a multiple of cement or concrete blocks and block styles used for building construction or walkways, slabs, both structural and nonstructural, precast sills, steps, lintels and many other shapes needed in construction, including precast columns, beams, girders, pretensioned structural members of all types, and post-tensioned structural members of all types. Also, by properly configurating and forming the mold, the mold may be used many times over: that is, by filling the mold with water, and pouring therein the cementitious composition, rather than mixing the cementitious composition previously with water or moisture and then placing the mixture in a mold or container.

The mold can be made of single or multiple piece sections, the only requirement being that it is capable of retaining water for a sufficient time to allow the dry components to be added thereto.

This procedure eliminates the conventional steam curing methods of making concrete or ligthweight blocks, bricks, elaborate equipment, vibrating and other treatments used in the manufacture of premolded materials. For many types of applications, multiple molds made of plastic are preferred, so that a house builder, a consumer, or anyone else can cast on the site all the necessary materials for the project or contract.

The setting time for the dry mixes referred to above can be increased considerably over that normally used with the present procedures of mixing the cement products with water before placement. Very fast formulations of cementitious compositions may be used, because there is no reason to mix these compounds, therefore eliminating the delay due to the various mixing procedures presently in use. Blocks, precast members, etc. can all be cast, set and stripped out of the mold within minutes.

Precasting and pouring cementitious matrices through water at the site eliminates or at least substantially minimizes damage of the cast components due to handling, storage and shipping which usually occurs with present manufactured precast product. Also, manufacturing these components at the job site generates little or no waste in materials used.

If lightweight blocks or shapes are desired, foaming or blowing compounds or agents which generate large amounts of gases can be added to the dry composition. Then upon addition of the dry composition to the water in the mold, these agents generate gases which provide porosity and light weight properties to the blocks or shapes. Also, when fillers are used, lightweight materials such as pumice, wood chips, hollow or low density components or mixtures thereof are preferred.

These blocks or shapes can be prepared in the shop or at the jobsite. Since the material cures fairly rapidly, blocks made on one day could be installed one day later. As noted above, when formed at the jobsite, breakage or damage due to shipment of the blocks is substantially reduced and minimized. Also, shipping costs are substantially reduced since only the dry mixture has to be delivered.

The system can be used with any normal additives acceptable to the specific composition. In some compositions, no curing agent is required. Furthermore, the compositions may contain numerous chemicals or additives that are compatible to the system for the purpose of improving or imparting certain properties. Additives such as accelerators, water reducers, bonding agents, curing agents, or pumping or waterproofing aids may be added to the compositions of the invention. These additives or modifying agents can be added to the water or to the cement mix, in any order or combination.

The examples show the success of adding cementitious compositions to water after the water is in place.

When dry, preblended materials are used, there is a much greater potential for higher quality finished product.

If aggregates are found to be too heavy, smaller aggregates or lighter weight aggregates can be used to keep the density of the overall system in balance.

The present invention provides the following:
1. Dry cement can be used.
2. Cement and sand can be used.
3. Cement, sand and aggregates can be used.
4. All types of cements can be used.
5. All types of cementitious particles, such as gypsums, limes and so forth can be used.
6. All types of chemical cements, even with water soluble parts, can be used.
7. No wet mixing or blending equipment is required.
8. No addition of water to mixes is required before placement, avoiding all equipment costs and clean up.
9. When placements under deep water conditions where tremés, elephant trunks or pipes would be required, the material under this formula can be placed dry in the tube and activated by available water at the end of the line, thus keeping all conveyances clear of wet cement.
10. When cement contents are too low in mixtures to prevent proper strength development or prevent overadsorption of water, resulting in weak or segregated mixes, more cement may be added, or water absorption material may be added, to prevent excess water from decreasing the quality of the mix.

Present cement mixes with less than 20 percent by weight of a cementitious binder should have some additional water absorption agent in the mix to prevent overwatering and segregation. Ideally, cementitious compositions of the mixtures should have the maximum amount of water absorbency possible. The higher the ratio of chemical bonded water to the binder, the better and more versatile a product will be achieved.

Cementitious mixtures containing more than 20 percent by weight cement may or may not need additional cement or water absorbers, depending on the application. Generally, at least 35 percent by weight of a cement binder is preferred for use in the compositions and methods of this invention.

While using liquids other than water, such as two component thermosetting organic compounds, an aggregate or sand can be dropped through the liquid or chemicals, causing the final mixture to be blended by gravity or by the solid ingredients passing through the liquid, which will result in a hardened mass of aggregate or sand and chemical.

EXAMPLES

The scope of the invention is further described in connection with the following examples which are set for the for the sole purpose of illustrating the preferred embodiments of the invention and which are not to be construed as limiting the scope of the invention.

The first 9 of the following examples are cementitious materials that were poured into a 4"×8" cylinder which was filled with water. The material was poured until it reached a level of about ½" below the top of the cylinder. The cementitious material was then allowed to cure. The results are described in Table I.

EXAMPLE 1

| Substance (common sand/cement mix) | Percentage |
|---|---|
| Portland Cement Type I | 20% |
| Sand | 80% |
| Set time is 20 hours. | |
| Compressive strength at 24 hours is 0.0 psi (too little cement) | |

EXAMPLE 2

| Substance | Percentage |
|---|---|
| Portland Cement Type I | 90% |
| Sand | 10% |
| Set time 12 hours. | |
| Compressive strength at 24 hours is 1,100 psi. | |

EXAMPLE 3

| Substance | Percentage |
|---|---|
| Portland Cement Type I | 50% |
| Sand | 50% |
| Set time 16 hours. | |
| Compressive strength at 24 hours is 600 psi. | |

EXAMPLE 4

| Substance | Percentage |
| --- | --- |
| Portland Cement Type I | 50% |
| Pea Gravel | 50% |

Set time 16 hours.
Compressive strength at 24 hours is 0.0 psi.
(different drop rates).

EXAMPLE 5

| Substance | Percentage |
| --- | --- |
| Portland Cement Type II | 50% |
| Plaster of Paris | 50% |

Set time is 10 minutes.
Compressive strength at 24 hours is 1,600 psi.

EXAMPLE 6

| Substance | Percentage |
| --- | --- |
| High Alumina Cement | 80% |
| Sand | 20% |

Set time is 12 hours.
Compressive strength at 24 hours is 1,100 psi.

EXAMPLE 7

| Substance | Percentage |
| --- | --- |
| High Alumina Cement | 20% |
| Sand | 80% |

Set time is 20 hours.
Compressive strength at 24 hours is 0.0 psi.
(too little cement).

EXAMPLE 8

| Substance | Percentage |
| --- | --- |
| High Alumina Cement | 25% |
| Portland Cement Type III | 25% |
| Lithium Carbonate | 1% |
| Sand | 49% |

Set time is 5 minutes.
Compressive strength at 24 hours is 1,100 psi.

EXAMPLE 9

| Substance | Percentage |
| --- | --- |
| Magnesium Oxide | 30% |
| Ammonium Phosphate | 10% |
| Sand | 60% |

Set time is 5 minutes.
Compressive strength at 24 hours is 1,100 psi.

EXAMPLE 10

A test was run wherein the resin and hardener were of approximate equal density in an epoxy formulation. The resin and hardener were poured into a container without premixing, then the aggregate was dropped through the resin and hardener, forming a homogeneous mixture which set into a hardened mass. The formula is given below.

| Substance | Percentage |
| --- | --- |
| Resin: | |
| Dow DER 331 | 13.1% |
| Epoxy Resin | |
| Furfural Alcohol | 3.3% |
| Hardener: | |
| Dow DEH 58 | 3.5% |
| Diethylene Triamine | |
| modified with | |
| Bisphenol A | |
| E6TPP Borg Warner | 3.5% |
| Triphenyl Phosphate | |
| Sand | 76.6% |

Set time is 30 minutes.
Compressive strength at 24 hours is 1,500 psi.

This test illustrates that various two component thermosetting organic materials can be applied without mixing. Such materials include polyesters, epoxies, polyurethanes and others. According to the invention, the resin and hardener are formulated into portions of substantially similar or identical densities, then poured into place without premixing. Then, the introduction of an additive or filler, such as sand or aggregate, into the poured materials, blends these components to a homogeneous mixture which is capable of curing to a hardened mass.

EXAMPLE 11

A mold in the shape of a block was prepared. The mold was then filled with water. Thereafter, each of the compositions of Examples 2, 3, 5, 6, 8 and 9, respectively, were prepared and poured into the water in the mold until the mold was substantially filled. Excess water was displaced from the mold by the introduction of the dry composition, and if additional water was added to the top of the filled mold to assure the composition was moist. After one hour, the blocks were removed from the mold, and after 24 hours strengths essentially the same as those obtained in the earlier examples were measured.

While is apparent that the invention herein disclosed is well calculated to fulfill the objects above stated, it will be appreciated that numerous modifications and embodiments may be devised by those skilled in the art, and it is intended that the appended claims cover all such modifications and embodiments as fall within the true spirit and scope of the present invention.

What is claimed is:

1. A method for forming a cured cementitious composition which comprises:
   providing an amount of water in excess of that needed for hydration of said amount of cementitious composition;
   pouring a dry cementitious composition of finely divided particles of at least one cement binder in an amount of at least 20 percent by weight of the composition, the major proportion of the particles having approximately the same drop rate, into the water in a manner such that the cementitious composition combines with a portion of the water without any type of physical mixing of the cementitious composition and water other than the mixing which occurs merely by applying the cementitious compositions into the water to completely hydrate the dry composition while displacing the remainder of the water; and allowing said hydrated cementitious composition to a substrate and allowing the applied composition to cure to a solid mass.

2. The method of claim 1 which further comprises providing means for holding said amount of water; wherein said dry cementitious composition is poured into said water in said holding means, hydrated, and then directed to a substrate.

3. The method of claim 2 wherein the water is held in, on or upon a substrate, and the dry cementitious material is poured thereinto.

4. The method of claim 2 wherein the holding means conforms to a predetermined desired shape for said cured cementitious composition.

5. The method of claim 2 wherein the cementitious composition further comprises a retarder compound to delay the curing the thereof.

6. The method of claim 1 wherein a gas generating agent is added to the composition so that porous, lightweight articles are obtained.

7. The method of claim 2 wherein said hydrated cementitious composition is poured, sprayed, or gunited onto said substrate.

8. The method of claim 7 wherein additional water is applied to the composition after placement on the substrate.

9. The method of claim 1 wherein a substrate containing an aperture is used to hold said water and said composition is applied to fill said aperture.

10. A method for applying cementitious composition on a substrate which comprises:

providing vessel means for holding a predetermined amount of a cementitious composition;

filling said vessel means with an amount of water in excess of that needed for hydration of said amount of cementitious composition;

pouring a dry cementitious composition of finely divided particles of at least one cement binder in an amount of at least 29% by weight of the composition wherein the major proportion of the particles have approximately the same drop rate into the water in the vessel means without any physical mixing other than that produced by pouring the cementitious composition into the water and in a manner such that the cementitious composition combines with a portion of the water to completely hydrate the dry composition while displacing the remainder of the water;

directing the hydrated cementitious composition onto a substrate; and allowing said hydrated cementitious composition to cure to solid mass.

11. The method of claim 10 wherein the hydrated cementitious composition is poured, sprayed, or gunited onto the substrate.

12. The method of claim 10 wherein the cementitious composition further comprises a retarder compound to delay the curing the thereof.

13. The method of claim 10 wherein additional water is applied to the composition after placement on the substrate.

14. The method of claim 10 wherein the substrate contains an aperture and said composition is applied to fill said aperture.

15. The method of claim 10 wherein the composition further comprises an amount of the filler component to provide a mixture having at least about 35 percent by weight of cement binder; said filler component in the form of particles, the major portion of which have approximately the same drop rate as the cement particles.

16. The method of claim 15 wherein the filler component is sand or aggregate.

17. The method of claim 15 wherein the mixture is dry blended to a homogenous consistency prior to being poured into the water.

18. The method of claim 10 wherein the cement binder is Portland cement, gypsum, high alumina cement, magnesium phosphate or a combination thereof.

19. The method of claim 18 wherein the cement binder represents about 35% by weight of the cementitious composition.

20. The method of claim 10 further comprising at least one of an accelerator, water reducing compound, pumping aid, water absorbing compound, waterproofing agent, polymer, wet expansion inhibitor or drying shrinkage inhibitor to impart a specific property to the composition.

21. The method of claim 10 which further comprises adding a sufficient amount of additional cement to absorb a portion of the excess water.

22. The method of claim 10 wherein a modifying agent is added to the composition after placement thereof.

* * * * *

UNITED STATES PATENT AND TRADEMARK OFFICE
CERTIFICATE OF CORRECTION

PATENT NO.   :   4,732,782
DATED        :   March 22, 1988
INVENTOR(S)  :   H. Nash Babcock and Edward P. Holub It is certified that error appears in the above-identified patent and that said Letters Patent is hereby corrected as shown below:

Column 9, line 3, change "allowing" to --applying--.

Signed and Sealed this

Fourth Day of October, 1988

Attest:

DONALD J. QUIGG

Attesting Officer    Commissioner of Patents and Trademarks